United States Patent
Wolter

(10) Patent No.: US 7,623,888 B1
(45) Date of Patent: Nov. 24, 2009

(54) RANKED PRESENTATION OF USER-INTERFACE DISPLAY ELEMENTS IN A USER-INTERFACE SKIN

(75) Inventor: Eric S. Wolter, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 921 days.

(21) Appl. No.: 11/046,082

(22) Filed: Jan. 28, 2005

(51) Int. Cl.
*H04M 1/00* (2006.01)
(52) U.S. Cl. .................................... 455/550.1
(58) Field of Classification Search ............... 455/550.1
See application file for complete search history.

(56) References Cited

U.S. PATENT DOCUMENTS

| | | | |
|---|---|---|---|
| 7,363,035 B2 * | 4/2008 | Reilly | 455/432.3 |
| 2002/0078291 A1 * | 6/2002 | Sutton et al. | 710/302 |
| 2005/0258199 A1 * | 11/2005 | Honer et al. | 223/66 |
| 2006/0041906 A1 * | 2/2006 | Vermola | 725/39 |
| 2006/0069642 A1 * | 3/2006 | Doran et al. | 705/39 |
| 2006/0207856 A1 * | 9/2006 | Dean et al. | 194/302 |
| 2007/0125620 A1 * | 6/2007 | Sorenson et al. | 194/217 |

FOREIGN PATENT DOCUMENTS

WO    WO03067465 A1 *    8/2003

* cited by examiner

*Primary Examiner*—Matthew D Anderson
*Assistant Examiner*—Bobbak Safaipour

(57) ABSTRACT

A method and apparatus for ranked presentation of user-interface display elements is disclosed. A device will hold data that indicates a priority order for selecting user-interface display elements, such as buttons, labels, etc., to present. When a user-interface skin is loaded onto the device and the skin has a limited number of slots (i.e., segments, spaces, places, etc.) for presenting user-interface display elements, the priority order will be used as a basis to select which elements to present in the available slots. For example, if the skin has only five slots for presentation of user-interface display elements, just the top five elements in the priority list will be presented. Those top five elements can then be presented in any order, such as in priority order, alphabetical order, or randomly.

20 Claims, 6 Drawing Sheets

USER-INTERFACE DISPLAY ELEMENT RANKING

| LINK | LABEL | PRIORITY |
|---|---|---|
| //device/applications/call-log | Call History | 1 |
| //device/applications/contacts | Phone Book | 2 |
| //device/applications/messaging | Messaging | 3 |
| //device/applications/web | Web | 4 |
| //device/applications/camera | Camera | 5 |
| Phone://913-555-0107 | Lindsey | 6 |
| Phone://913-555-0712 | Adam | 7 |
| //device/applications/games/pinball | Pinball | 8 |
| //device/applications/games/solitaire | Solitaire | 9 |
| http://www.google.com | Google | 10 |
| http://www.mapquest.com | Maps | 11 |
| http://www.ebay.com | Ebay | 12 |

Fig. 5

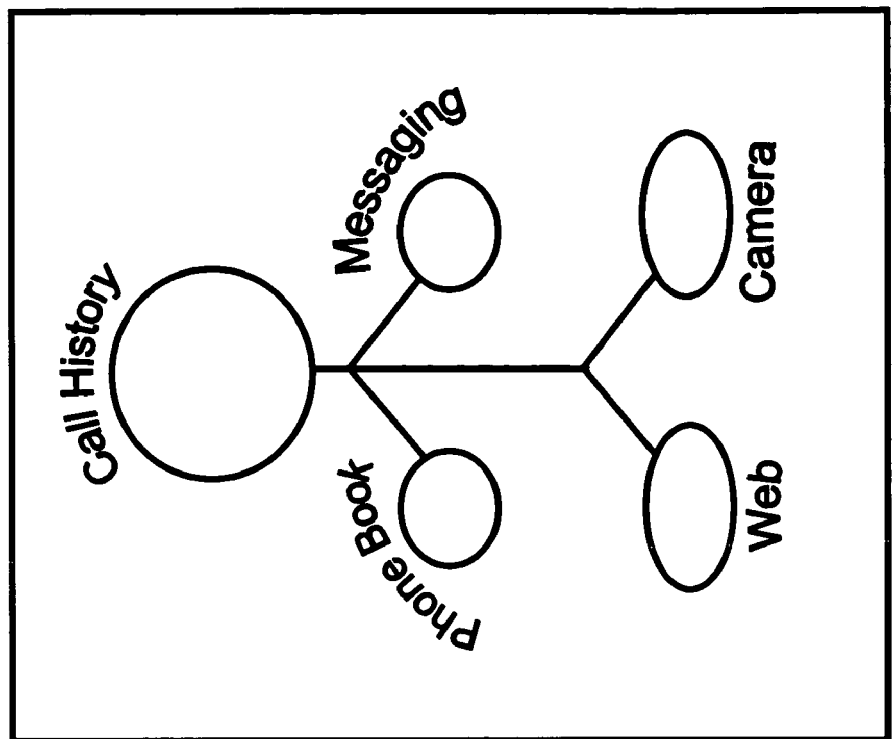
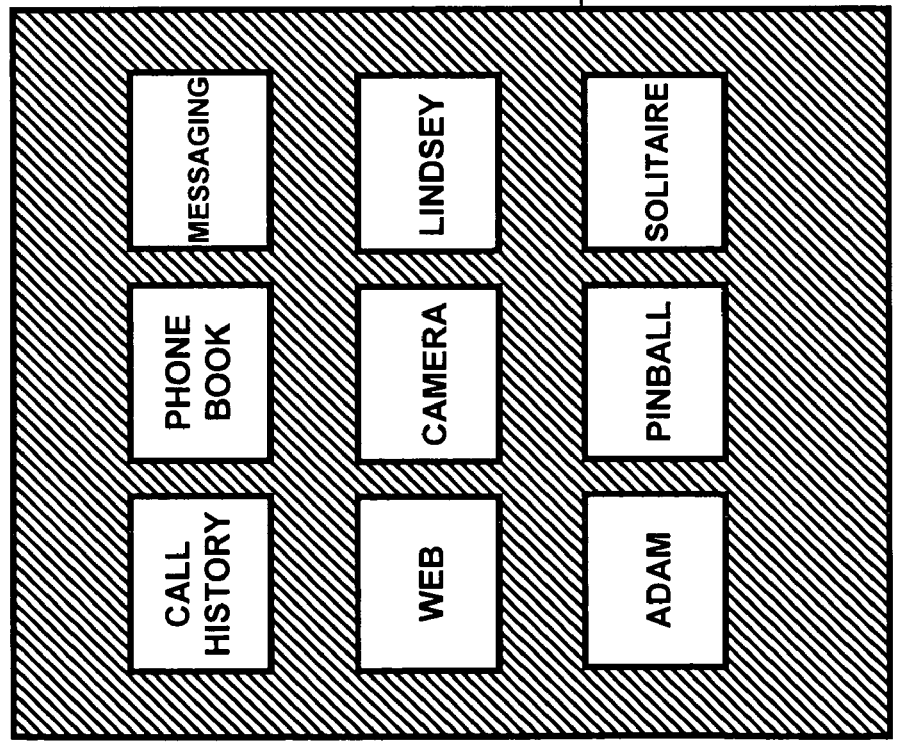
Fig. 6

RANKED PRESENTATION OF USER-INTERFACE DISPLAY ELEMENTS IN A USER-INTERFACE SKIN

FIELD OF THE INVENTION

The present invention relates to user-interface display technology and, more particularly, to presentation of user-interface "skins" on wireless communication devices such as cell phones for instance.

BACKGROUND

The user-interface has become a significant element of many telecommunication devices, ranging from desktop personal computers to handheld cell phones and personal digital assistants. In early days, the user-interface on most devices was monochrome and rudimentary, often limited to simple text display and basic tone output. With advances in both processing power and display and sound driver technology, the user-interface has grown to be far more interesting and diverse. Most user-interfaces today include full-color high-resolution displays and robust audio output, suitable for presenting images and sounds of all sorts.

One recent trend in user-interface technology has been the advent of user-interface "skins." As the name suggests, a user-interface "skin" is a covering or dressing applied to the core functions of a user-interface.

The core functions of a user-interface may include display elements such as (i) buttons and pull-down menus that a user can select, so as to invoke various device functions, (ii) information-display areas for presenting text, graphics, and other types of information, (iii) borders and visual casings or windows for containing various display elements, (iv) scroll bars that a user can employ to scroll through displayed information, (v) cursors, such as arrows, for pointing to and highlighting buttons or displayed information, and (vi) audio outputs to alert a user of various device states or events. Further, specialized devices or user-interfaces may have any of a variety of specialized user-interface functions.

A user-interface skin typically enhances these or other user-interface functions by dressing the functions in thematic graphics and/or sounds. By way of example, a user-interface skin may provide (i) special graphics to be displayed as selectable buttons or menus, (ii) special graphics, such as texture-graphics or photographic images, to be displayed as backgrounds, foregrounds, borders, casings, and/or other aspects of the user-interface, (iii) cursor graphics, (iv) color schemes, such as border colors, text colors, and button colors, (v) special fonts for displayed text, (vi) and special sounds, such as music or tones to be provided as audio output. Further, a user-interface skin can define the arrangement of user-interface components, such as the relative positioning of button graphics, menus, informational display sections, and the like, as well as associations between particular sounds and device states and events.

User-interface skins can be applied to user-interfaces of particular program applications that run on a device or a user-interface of the device generally (e.g., to a core device-management application). For example, a particular application may run in its own display window of the device (regardless of whether the window is maximized to fit the entire display screen) and may define its own set of user-interface functions. A skin can be applied to such a user-interface, in order to enhance visual and/or audible elements of the user-interface. As another example, a device may have a core device-management application, such as an operating system application, that supports execution of other applications or implementation of various device functions. Like more specific program applications, the core device-management application may itself define a user-interface including user-interface functions such as those described above. And a skin can be similarly applied to such a user-interface to enhance various elements of the user-interface.

A given user-interface can have a permanent skin that is hard coded as an integral aspect of the user-interface at the time of application-design or device-manufacture. Alternatively, a user-interface can be arranged to have any of a variety of skins selected by a user. By way of example, a device or application may come pre-set with a number of skins that a user can select to apply to the user-interface. Through an "options" menu, for instance, the user may select a desired skin, and the device or application may apply that skin to the user-interface. As another example, a user may visit a website to acquire a new skin for a given user-interface and may then direct the device or application to apply that new skin to the user-interface. As still another example, a user-interface skin could be sent to User-interface skins can be encoded and applied to user-interfaces in any of a variety of ways. Some skins may be encoded in a way that uniquely relates to a particular user-interface, such as in the form of executable code that sets attributes of specific user-interface objects (possibly unique to a particular application). Other skins may be defined in a more open manner, such as with an extensible markup language (XML) script or as a skin object that can be interpreted and applied by a user-interface skin-interpretation program.

An example of user-interface skins are those provided by Qualcomm Inc., of San Diego, Calif. (formerly by Trigenix Limited, of Cambridge, UK), for use on wireless handheld devices such as cell phones and personal digital assistants. Qualcomm encodes user-interface skins (or skin updates) with industry standard XML, to define precise positioning and appearance of user-interface elements on the relatively small display screens of wireless handheld devices. Qualcomm provides a skin development application called Trig-builder™, which allows building, testing and debugging of XML-based skins or skin updates called "Trigs" or "Triglets". Qualcomm then provides an application called Trigplayer™, which runs on a wireless handset and is arranged to receive and render a Trig or Triglet defining a particular skin or skin update and to apply the skin or skin update to the user-interface of the handset. Further, Qualcomm provides a Trigserver™ application that runs on a network server and manages Trigs and Triglets to facilitate transmission of the Trigs and Triglets over the air to wireless handsets.

SUMMARY

The present invention is directed to a method and system for presenting user-interface display elements within slots defined by user-interface skins and, more particularly, to a method and system for selecting and presenting user-interface display elements when a user-interface skin has a limited number of display slots.

According to the invention, a device will hold data that indicates a priority order for selecting user-interface display elements, such as buttons, labels, etc., to present. When a user-interface skin is loaded onto the device and the skin has a limited number of slots (i.e., segments, spaces, places, etc.) for presenting user-interface display elements, the priority order will be used as a basis to select which elements to present in the available slots. For example, if the skin has only five slots for presentation of user-interface display elements, just the top five elements in the priority list will be presented. Those top five elements can then be presented in any order, such as in priority order, alphabetical order, or randomly.

An exemplary embodiment of the invention may take the form of a wireless handheld device (e.g., cell phone and/or personal digital assistant) that includes a processor, data storage, a display screen, a wireless communication interface, ranking-data defining a rank-ordered listing of N user-interface display elements (e.g., buttons/links to invoke certain functions, etc.), and program logic (e.g., machine language instructions) executable by the processor to carry out various functions, including (i) receiving a user-interface skin defining P slots for presentation of user-interface display elements, where P<N, (ii) selecting the top P ranked user-interface display elements of the rank-ordered listing, and (iii) presenting the P selected user-interface display elements in the P slots of the user-interface skin on the display screen.

Some or all of the ranking-data can be provisioned into the device at the time of device manufacture or distribution. Alternatively, some or all of the ranking-data can be provisioned into the device at a later time, such as by a user. In that regard, the device can further include a setup program through which a user or other party can define (i) user-interface display elements (e.g., links to various device functions) and (ii) a priority level respectively for each of the user-interface display elements.

In operation, the device will receive the user-interface skin via its wireless communication interface. For instance, the skin could be transmitted to the device via a cellular radio access network from a skin server on a packet-switched network. Alternatively, the device can receive the user-interface skin in some other manner, such as over a cable connection from a personal computer or locally-connected provisioning system.

Another exemplary embodiment of the invention may take the form of a method carried out by a wireless handheld device. Such a method may involve (i) maintaining in the wireless handheld device a set of ranking-data that defines a rank-ordered listing of N user-interface display elements (e.g., buttons/links to invoke certain functions, etc.), (ii) receiving into the wireless handheld device a user-interface skin defining P slots for presentation of user-interface display elements, where P<N, (iii) selecting the top P ranked user-interface display elements of the rank-ordered listing, and (iv) presenting the P selected user-interface display elements in the P slots of the user-interface skin on the display screen.

The invention has various advantages. By way of example, the invention can help to ensure that certain important display elements, such as buttons that link to core device functions (e.g., a web browser application, a camera application, and a phone book application), are presented and are thus readily accessible to a user. To accomplish this, those buttons/links can be simply listed at the top of the rank-ordered listing. As another example, the rank-ordered listing can be persistently applied to any skin that is loaded onto the device. Thus, notwithstanding a change in skin on the device, at least the top listed display elements would still likely be presented. Further, the rank-ordered listing could be configured as a data file that is transferable from device to device. That way, a user can readily provision multiple devices to apply a common rank-ordered listing, favoring certain display elements over others.

These as well as other aspects, advantages, and alternatives will become apparent to those of ordinary skill in the art by reading the following detailed description, with reference where appropriate to the accompanying drawings.

BRIEF DESCRIPTION OF THE DRAWINGS

FIG. 5 is an example rank-ordered listing of user-interface display elements.

FIG. 6 is an illustration of the skins of FIG. 4, to which the rank-ordered listing of FIG. 5 has been applied.

DETAILED DESCRIPTION OF AN EXEMPLARY EMBODIMENT

Figure 1:
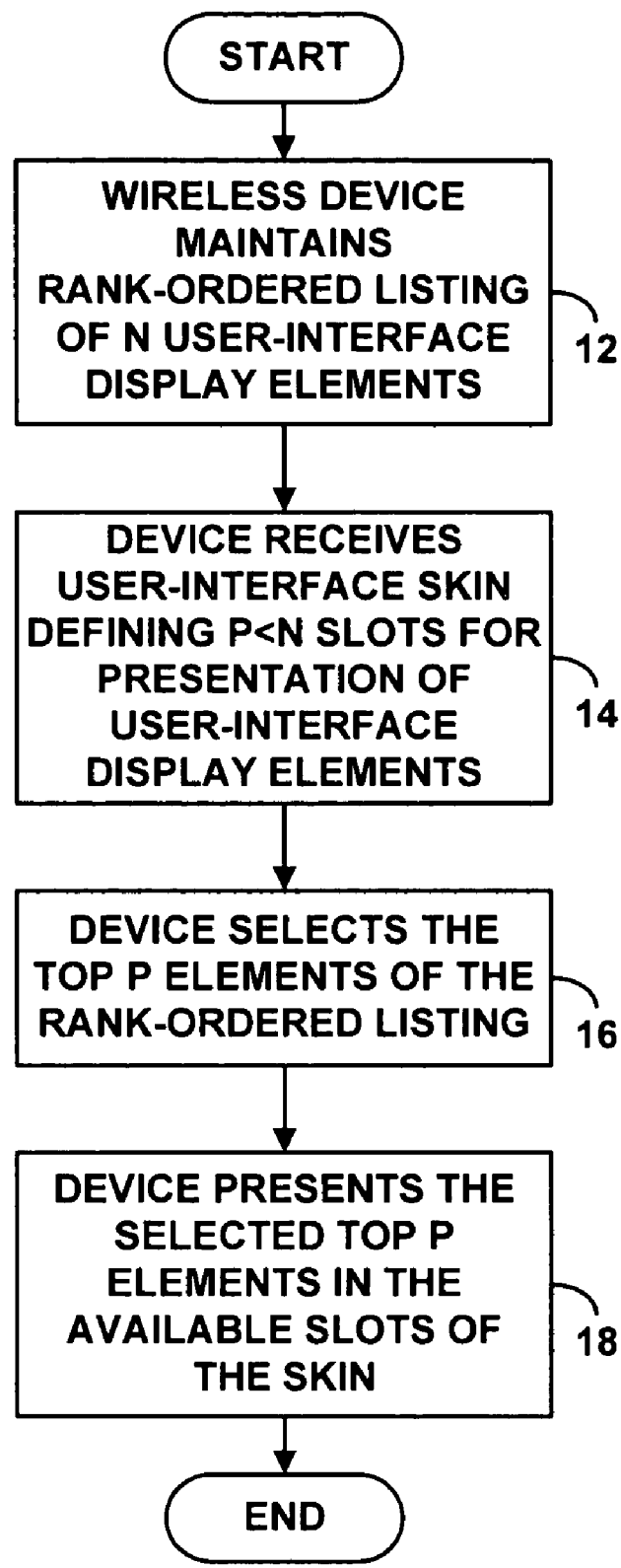
FIG. 1 is a flow chart illustrating function carried out in accordance with an exemplary embodiment of the invention.

Referring to FIG. 1, a flow chart is provided to illustrate various functions that can be carried out in accordance with an exemplary embodiment of the invention. It should be understood that this flow chart and the other illustrations and descriptions provided herein are set forth for purpose of example only and that many variations are possible. For instance, functions and system components can be added, removed, combined, distributed, or otherwise changed. Further, it should be understood that the various functions described herein can be carried out by hardware, software, and/or firmware logic, such as by program logic executed by one or more processors.

As shown in FIG. 1, at step 12, a wireless device maintains a set of ranking-data that defines a rank-ordered listing of N user-interface display elements. As noted above, this data can be provisioned into the device at the time of manufacture or distribution, or it can be provisioned later, such as by user-input through a device provisioning interface. In a preferred embodiment, a wireless carrier will pre-provision the device with at least a portion of the rank-ordered listing, such as with top ranked display elements including buttons/links for invoking core device functions such as a web browser, a camera application, and a phone book for instance. That way, those core device functions will be most likely to be displayed, regardless of which skin is loaded on to the device at any given time. Beyond that, the device may include a setup program through which a user can edit the rank-ordered listing, so as to add additional user-defined display elements, to change priorities of display elements, and to make other changes as desired.

The user-interface display elements listed in the rank-ordered listing can take various forms and can be listed in various ways. Preferably, for instance, the display elements will be links that can be assigned to graphical buttons selectable by a user to invoke specified functions or to browse to specified device or network locations. Such links can be set forth in the rank-ordered listing as uniform resource identifiers (URIs) or as function calls for instance. However, the display elements may take other forms as well, including but not limited to those identified in the background section above, and they can be set fort in the rank-ordered listing in other ways as well.

Continuing with the process of FIG. 1, at step 14, the device receives a user-interface skin that defines slots for presentation of user-interface display elements. The device preferably receives the user-interface skin wirelessly over an air interface, such as through transmission from a network based skin-server and via a wireless communication interface of the device. By way of example, the skin can be configured as a Trig or Triglet, a Trigserver™ application can transmit the skin via a wireless link to the device, and a Trigplayer™ application on the device can apply the skin to the device's user-interface. Alternatively, however, the device may receive the skin in some other way, such as over a cable connection from a personal computer or locally-connected provisioning system (e.g., at a retail store) for instance.

The slots of the skin may take various forms, depending on the type of user-interface display elements that are to be presented, for instance. By way of example, if the user-interface display elements are links to particular functions, the slots might be graphical buttons to which the links can be assigned so that a user can invoke a function by conventionally selecting a graphical button.

By way of example, a given skin might define an image of a cartoon character, whose head, hands, and feet all constitute slots for presentation of user-interface buttons. Once the skin is applied, the character's head might then become a labeled button selectable by a user to invoke a first function, the character's right hand might become a labeled button selectable by the user to invoke a second function, the character's left hand might become a labeled button selectable by the user to invoke a third function, and so forth.

As another example, a given skin might define an image of a house, in which the windows and doors constitute slots for presentation of user-interface buttons. Once the skin is applied, the door of the house might become a labeled button selectable by a user to perform a, first function, one window might become a labeled button selectable by the user to invoke a second function, another window might become a labeled button selectable by the user to invoke a third function, and so forth.

As indicated in FIG. 1, the user-interface skin that the device receives has P slots for presentation of user-interface display elements, i.e., the skin has P places where user-interface display elements can be presented, and P is less that N. That is, the number of slots defined by the user-interface skin for presentation of user-interface display elements is less than the number of user-interface display elements listed in the rank-ordered listing. For instance, the user-interface skin might define 6 specially positioned button graphics, each of which can be linked to (assigned to invoke) a particular user-interface function. Yet the rank-ordered listing of user-interface display elements might list 10 user-interface functions, such as 10 links to functions or network/device locations. At issue is then which of the functions to assign to the limited number of available button graphics of the skin.

According to the exemplary embodiment, at step 16, the device selects the top P ranked user-interface display elements of the rank-ordered listing, and, at step 18, the device presents those P selected user-interface display elements in the available P slots of the skin. Continuing with the example above for instance, where the skin defines 6 slots but where the rank-ordered listing lists 10 user-interface display elements, the device would select the top 6 ranked user-interface display elements and present those elements in the available 6 slots of the skin. For instance, if each of the top 6 user-interface display elements in the rank-ordered listing defines a respective link to a device function, and each of the 6 available slots is a button graphic, the device may associate each button graphic with a respective one of those top ranked 6 links. With the skin in place, the remaining 4 user-interface display elements (the bottom ranked 4 elements) might not be presented, or might instead be accessible only through other means (e.g., through subsidiary menus or the like).

In the preferred embodiment, the rank-ordered listing will uniquely prioritize each listed user-interface display element so that there is a clear order of priorities among the listed display elements. For example, the rank-ordered listing can be arranged as a flat file list or linked-list of the display elements, with the order of the elements in the list signifying the respective priorities or rankings of the elements. As another example, the rank-ordered listing could be set forth as a table of data, in which priority values are listed for each display element.

In some embodiments, however, there could be a tie in priority between two or more of the user-interface display elements. When that happens, if the tied user-interface display elements all fall within the top P ranked elements of the rank-ordered listing, then all of the tied elements can be selected and presented. If, however, only some of the tied elements fall within the top P ranked elements of the rank-ordered listing, then the device could programmatically select one or more of the tied elements to present, such as by prompting a user to pick which one(s) to present, or through random selection, for instance.

Figure 2:
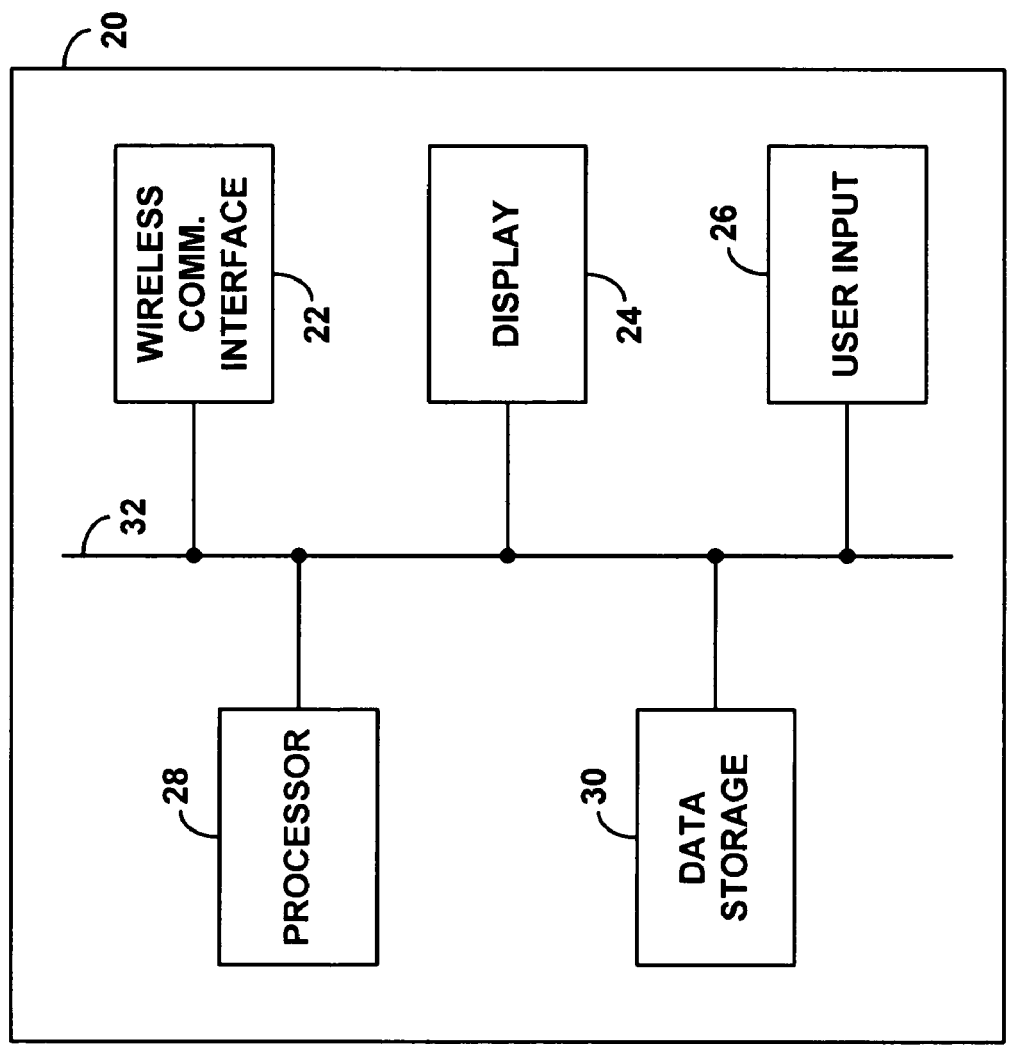
FIG. 2 is a simplified block diagram depicting functional components of a wireless handheld device arranged to carry out the exemplary embodiment.

FIG. 2 is a simplified block diagram of a wireless handheld device 20, showing some of the core functional components of the device. As illustrated, the example device 20 includes a wireless communication interface 22, a display 24, a user input block 26, a processor 28, and data storage 30, all of which may be coupled together by a system bus or other mechanism 32.

The wireless communication interface 22 functions to allow the device to wirelessly communicate with a radio access network according to a defined protocol, such as CDMA, TDMA, GSM, 802.11, BLUETOOTH, or the like. The wireless communication interface 22 may comprise a chipset such as an MSM-series chipset available from Qualcomm Inc., together with a radio frequency antenna.

The display 24 may comprise an LCD, OLED, or other form of display, preferably arranged to present high resolution, full color graphics such as graphical buttons and other user-interface display elements as described above. The user input block 26 functions to receive user input, and as such can take various forms, such as a keypad, a voice-recognition interface, a touch-sensitive display screen panel, or the like.

The processor 28 may comprise one or more general-purpose processors (e.g., INTEL or AMD microprocessors) and/or one or more special-purpose processors (e.g., digital signal processors, application specific integrated circuits, etc.) The data storage 30 may in turn comprise one or more volatile and/or non-volatile storage components, which can be integrated in whole or in part with processor 28. For instance, data storage 30 can include magnetic and/or optical data storage components.

Data storage 30 preferably contains or is arranged to contain a rank-ordered listing and a user-interface skin as described above. Further, data storage 30 preferably contains program logic (e.g., machine language instructions) executable by processor 28 to carry out various functions as described herein. Those functions include, for instance, (i) receiving and maintaining a rank-ordered listing, e.g., through a setup program, (ii) receiving a skin, e.g., via the wireless communication interface 22, (iii) applying the rank-ordered listing to determine which user-interface display elements to present in available slots of the skin, and (iv) displaying the skin, with those user-interface-display elements, on display 24. The program logic may define other functions as well.

Figure 3:
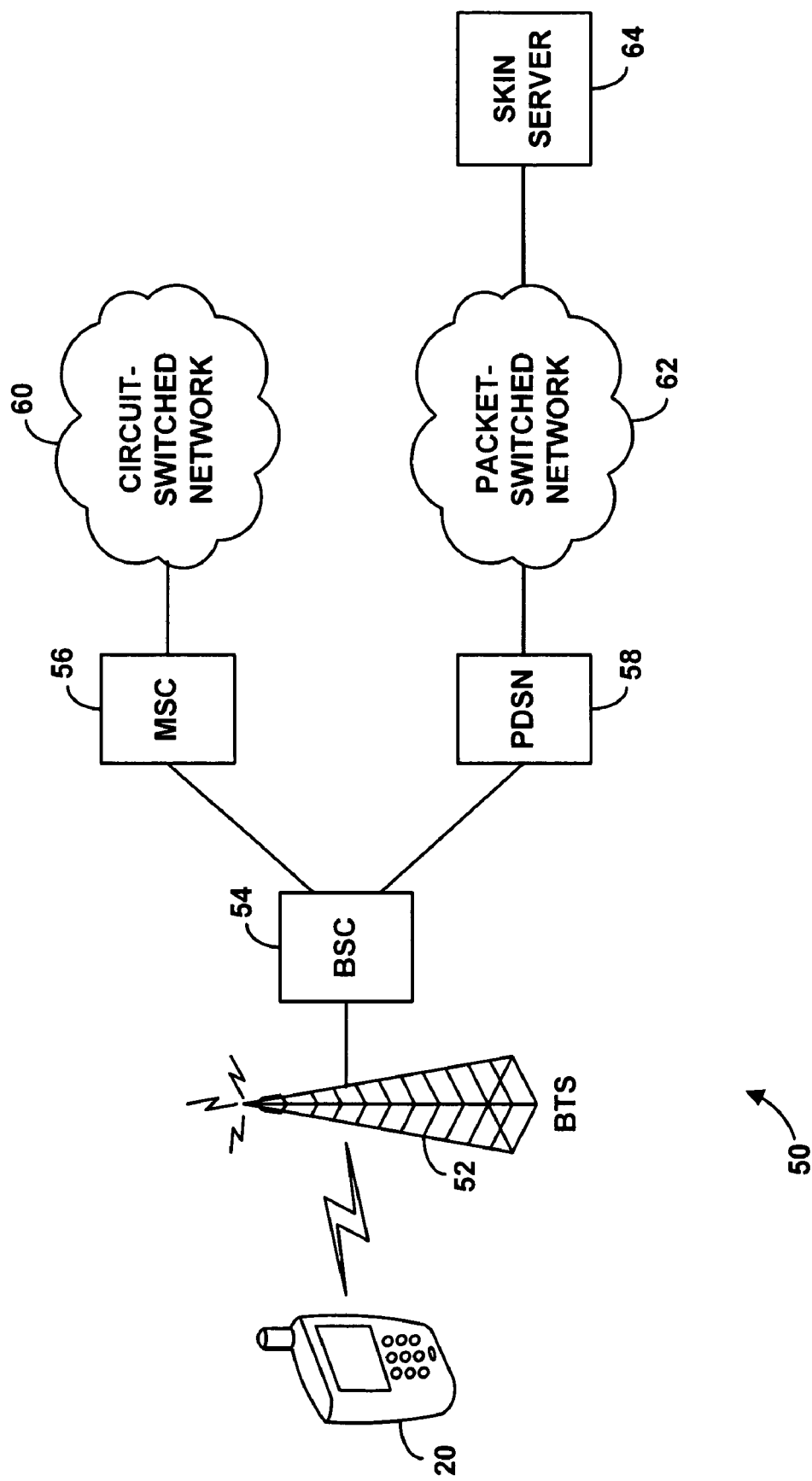
FIG. 3 is a block diagram of a wireless communication network in which the exemplary embodiment can be employed.

FIG. 3 next depicts an example wireless communication network 50 in which device 20 can operate. Network 50 includes a base transceiver station (BTS) 52, which radiates to define a coverage area for device 20. BTS 52 is then coupled or integrated with a base station controller (BSC) 54, which is in turn coupled with a mobile switching center (MSC) 56 and/or packet data serving node (PDSN) 58. The MSC 56 may provide connectivity with a circuit-switched transport network 60 such as the public switched telephone network (PSTN), and the PDSN 58 may provide connectivity with a packet-switched transport network 62 such as a wireless carrier's core packet network and/or the Internet.

Shown sitting on the packet-switched network 60 is a skin server 64, which can be a computer server or server application arranged to store and transmit user-interface skins. For instance, skin server 64 may be a Trigserver™ that can transmit skins as Trigs or Triglets to device 20. In operation, device 20 may thus receive a skin from server 60 and apply the skin to its user-interface, using its stored rank-ordered listing as a basis to determine which user-interface display elements to present in the available slots of the skin.

Figure 4:
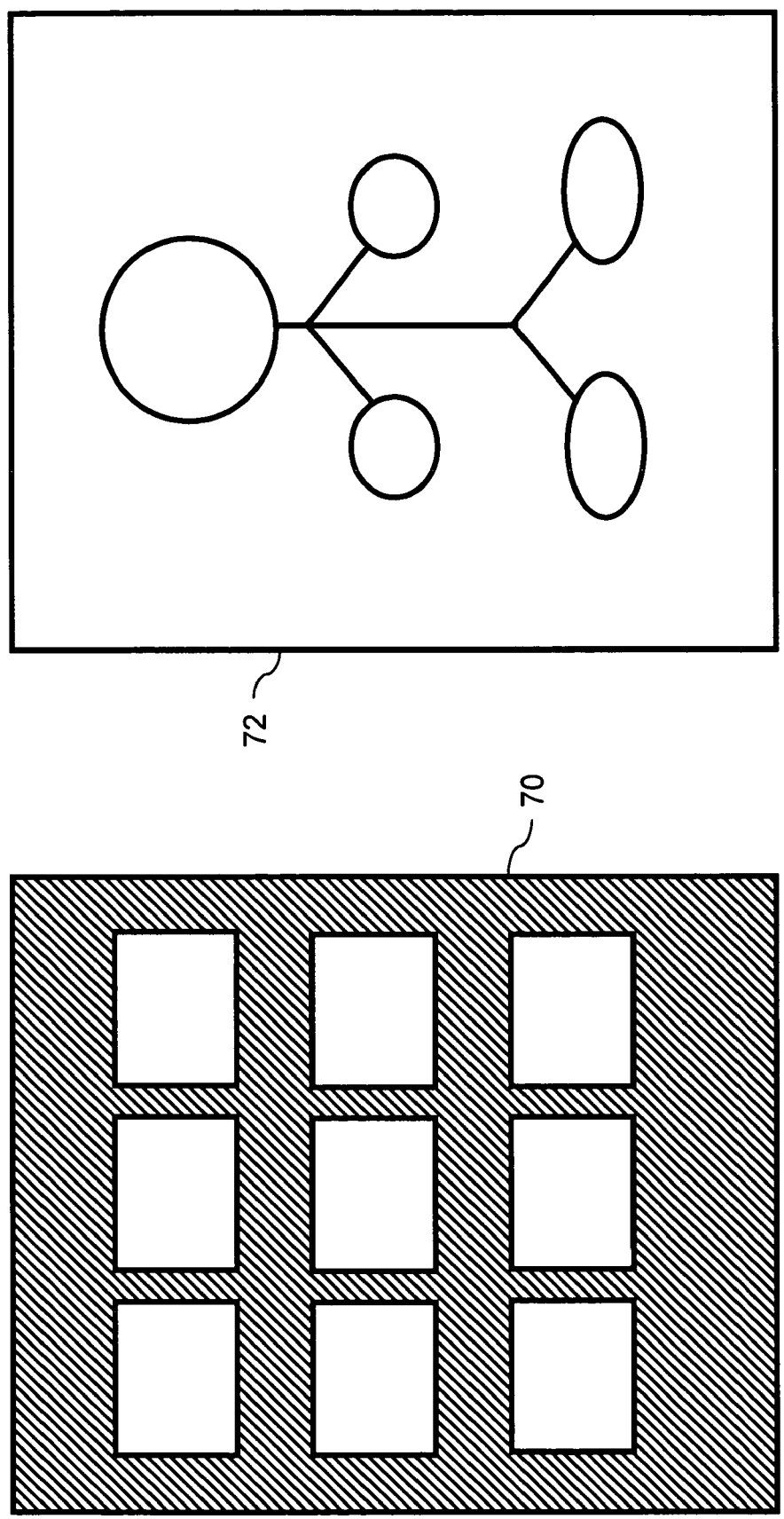
FIG. 4 is an illustration of example user-interface skins that can be employed in accordance with an exemplary embodiment.

To illustrate how the exemplary embodiment can operate in practice, (i) FIG. 4 depicts two example skins 70, 72 that are not yet applied to the user-interface of device 20, (ii) FIG. 5 depicts an example rank-ordered listing of user-interface display elements, which might be stored in data storage 30 of device 20, and (iii) FIG. 6 depicts the skins of FIG. 4 applied to the user-interface of device 20 in view of the rank-ordered listing of FIG. 5.

As shown in FIG. 4, example user-interface skin 70 includes a nine slots for presentation of user-interface display elements. In this example skin 70, the slots are graphical buttons (shown as simple boxes in the illustration) arranged in a three-by-three array over a hatched background image. Skin 70 may be encoded to display each of these button-graphics in a particular color and style bearing a designated text label, and to associate each button-graphic with a designated URI or function-call.

Example user-interface skin 72, in turn, includes five slots for presentation of user-interface display elements. In this example skin 72, the slots are graphical buttons laid out as the head, hands, and feet of a cartoon character (depicted as a stick-figure). Skin 72 may be encoded to display each of these button-graphics in a particular color and style, to present next to each button-graphic a designated text label, and to associate each button-graphic with a designated URI or function-call.

As shown next in FIG. 5, the example rank-ordered listing takes the form of a table of data in which each row represents a given user-interface display element and has columns for (i) link, (ii) label, and (iii) priority. In this example table, the first five entries represent user-interface display elements (e.g., buttons) for invoking the core device functions a call log, a phone book, a messaging application, a web browser, and a camera phone application. The next two entries represent user-interface display elements (e.g., buttons) for invoking speed-dialing to call telephone numbers of "Lindsey" and "Adam." The next two entries represent user-interface display elements (e.g., buttons) for invoking games, namely, pinball and solitaire. And the last three entries represent user-interface display elements (e.g., buttons) for browsing to particular web pages, namely, Google, Mapquest, and Ebay. In this example, the user-interface display elements have priorities corresponding to the order in which they are listed in the table, with the first-listed element having the highest priority, and the last-listed element having the lowest priority.

The rank-ordered listing of FIG. 5 sets forth P=12 user-interface display elements. However, skins 70 and 72 each define fewer than 12 slots for presentation of user-interface display elements. Skin 70 defines only N=9 slots, and skin 72 defines only N=5 slots. In accordance with the exemplary embodiment, when processor applies one of these skins to the user-interface of device 20, processor 28 will thus apply the rank-ordered listing of FIG. 5 to determine which user-interface display elements to present.

When applying skin 70 to the user-interface of device 20, since skin 70 includes only nine slots, processor 28 will select the top nine user-interface display elements that are set forth in the rank-ordered listing, and processor 28 will present those top nine elements in the nine available slots. As noted above, the order of presentation could be the order in which the elements are set forth in the rank-ordered listing or could be some order. In this example, as shown in FIG. 6, processor 28 presents the top nine elements of the rank-ordered listing in priority order in the available slots. Thus, the nine buttons of skin 70 become user-selectable buttons labeled and linked to invoke the functions call history, phone book, messaging, web, camera, Lindsey, Adam, pinball, and solitaire. The remaining three user-interface display elements, Google, maps, and Ebay, would not be presented in this skin image but could be made accessible to the user in some other way.

When applying skin 72 to the user-interface of device 20, on the other hand, since skin 72 includes only five slots, processor 28 will select just the top five user-interface display elements that are set forth in the rank-ordered listing, and present those top five elements in the five available slots. In this example, the buttons of skin 72 become user-selectable buttons labeled and linked to invoke the functions of call history, phone book, messaging, web, and camera. And in this case, the remaining seven user-interface display elements, Lindsey, Adam, pinball, solitaire, Google, maps, and Ebay, would not be presented on this screen image but could be made accessible to the user in some other way.

As noted above, a rank-ordered listing like that shown in FIG. 5 can be applied to various skins loaded onto a device. In practice, for instance, device 20 might first receive skin 70 from skin server 64 and may apply the rank-ordered listing to determine which user-interface display elements to present within the slots of skin 70. Thereafter, device 20 might receive skin 72 from skin server 64 and may apply the rank-ordered listing to determine which user-interface display elements to present within the slots of skin 72. Further, in certain embodiments, a user could transfer the rank-ordered listing file from one device to another, so as to be able to apply the rank-ordered listing to skins on more than one device.

An exemplary embodiment of the present invention has been described above. Those skilled in the art will understand, however, that changes and modifications may be made to this embodiment without departing from the true scope and spirit of the invention, which is defined by the claims.

I claim:
1. A wireless handheld device comprising:
   a processor;
   data storage;
   a display screen;
   a wireless communication interface for communicating over an air interface;
   ranking-data stored in the data storage, the ranking-data defining a rank-ordered listing of N user-interface display elements; and
   program logic stored in the data storage and executable by the processor, wherein the program logic is executable with respect to a first user-interface skin defining P slots for presentation of user-interface display elements, where 1<P<N, (i) to select the top P ranked user-interface display elements of the rank-ordered listing, and (ii) to present the P selected user-interface display elements in the P slots of the first user-interface skin on the display screen, and wherein the program logic is executable with respect to a second user-interface skin defining P' slots for presentation of user-interface display elements, where 1<P'<N and where P' is not equal to P, (i) to select the top P' ranked user-interface display elements of the rank-ordered listing, and (ii) to present the P' selected user-interface display elements in the P' slots of the second user-interface skin on the display screen.

2. The wireless handheld device of claim 1, wherein the program logic is further executable to receive the first user-interface skin and to present the P selected user-interface display elements as claimed, and to subsequently receive the second user-interface skin and to present the P' selected user-interface display elements as claimed.

3. The wireless handheld device of claim 2, wherein the program logic is executable to receive the first user-interface skin via the wireless communication interface and to receive the second user-interface skin via the wireless communication interface.

4. The wireless handheld device of claim 2, wherein the program logic is executable to receive the first user-interface skin from a skin-server on a packet-switched network and to receive the second user-interface skin from a skin-server on a packet-switched network.

5. The wireless handheld device of claim 1, wherein the program logic is further executable to present the P selected user-interface display elements in the order in which the P selected user-interface display elements are ranked by the rank-ordered listing and to present the P' selected user-interface display elements in the order in which the P' selected user-interface display elements are ranked by the rank-ordered listing.

6. The wireless handheld device of claim 1, wherein the user-interface display elements comprise graphical buttons selectable by a user to invoke device functions.

7. The wireless handheld device of claim 1, wherein the first user-interface skin defines on the display screen a representation of a cartoon character having a head, hands, and feet that all constitute slots of the P slots.

8. The wireless handheld device of claim 1, wherein the first user-interface skin defines on the display screen a representation of a house in which at least a window and a door constitute slots of the P slots.

9. The wireless handheld device of claim 1, wherein the program logic is further executable to receive a user-definition of at least a portion of the rank-ordered listing, wherein the user-definition defines priorities among user-interface display elements in the rank-ordered listing.

10. The wireless handheld device of claim 6, wherein the user-definition defines a function for the device to carry out in response to user selection of a given user-interface display element.

11. The wireless handheld device of claim 1, wherein the device is at least one of a cellular telephone and a personal digital assistant.

12. The wireless handheld device of claim 1, wherein the rank-ordered listing includes, as top ranked display elements, buttons or links for invoking core device functions selected from the group consisting of a web browser, a camera application, a phone book, a call log, and a messaging application.

13. The wireless handheld device of claim 1, wherein the rank-ordered listing is transferable from the wireless handheld device to another device, for use by the other device as a basis to select user-interface display elements to present on the other device.

14. A method comprising:
maintaining in a wireless handheld device a set of ranking-data that defines a rank-ordered listing of N user-interface display elements;

with respect to a first user-interface skin defining P slots for presentation of user-interface display elements, where 1<P<N, the wireless handheld device (i) selecting the top P ranked user-interface display elements of the rank-ordered listing, and (ii) presenting the P selected user-interface display elements in the P slots of the first user-interface skin on a display screen of the wireless handheld device; and with respect to a second user-interface skin defining P' slots for presentation of user-interface display elements, where 1<P'<N and where P' is not equal to P, the wireless handheld device (i) selecting the top P' ranked user-interface display elements of the rank-ordered listing, and (ii) presenting the P' selected user-interface display elements in the P' slots of the second user-interface skin on the display screen.

15. The method of claim 14, wherein the wireless handheld device comprises a wireless communication interface, the method further comprising:
the wireless handheld device receiving the first user-interface skin via the wireless communication interface; and
the wireless handheld device receiving the second user-interface skin via the wireless communication interface.

16. The method of claim 14, further comprising:
transferring the ranking-data from the wireless handheld device to another wireless handheld device; and
using the ranking-data in the other wireless handheld device to determine which user-interface display elements to present on the other wireless handheld device.

17. The method of claim 14, wherein the first user-interface skin defines on the display screen a representation of a cartoon character having a head, hands, and feet that all constitute slots of the P slots.

18. The method of claim 14, wherein the first user-interface skin defines on the display screen a representation of a house in which at least a window and a door constitute slots of the P slots.

19. A method comprising:
maintaining in a wireless handheld device a set of ranking-data that defines a rank-ordered listing of N user-interface buttons;

receiving into the wireless handheld device a user-interface skin defining P slots for presentation of user-interface buttons on a display screen of the wireless handheld device, P being greater than 1 and less than N, and the user-interface skin defining a graphical representation of a cartoon character having a head, hands, and feet that all constitute slots of the P slots;

the wireless handheld device executing program logic to select the top P ranked user-interface buttons of the rank-ordered listing; and the wireless handheld device presenting the P selected user-interface buttons in the P slots of the user-interface skin on the display screen of the wireless handheld device, including (i) presenting on the display screen one of the P selected user-interface buttons at the head of the cartoon character, (ii) presenting on the display screen one of the P selected user-interface buttons at one of the hands of the cartoon character, and (iii) presenting on the display one of the P selected user-interface buttons at another hand of the cartoon character.

20. The method of claim 19, further comprising:

transferring the ranking-data from the wireless handheld device to another wireless handheld device; and using the ranking-data in the other wireless handheld device to determine which user-interface buttons to present on the other wireless handheld device.

* * * * *

UNITED STATES PATENT AND TRADEMARK OFFICE
CERTIFICATE OF CORRECTION

PATENT NO. : 7,623,888 B1 Page 1 of 1
APPLICATION NO. : 11/046082
DATED : November 24, 2009
INVENTOR(S) : Eric S. Wolter It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1179 days.

Signed and Sealed this

Twenty-sixth Day of October, 2010

David J. Kappos
*Director of the United States Patent and Trademark Office*